Patented Mar. 31, 1925.

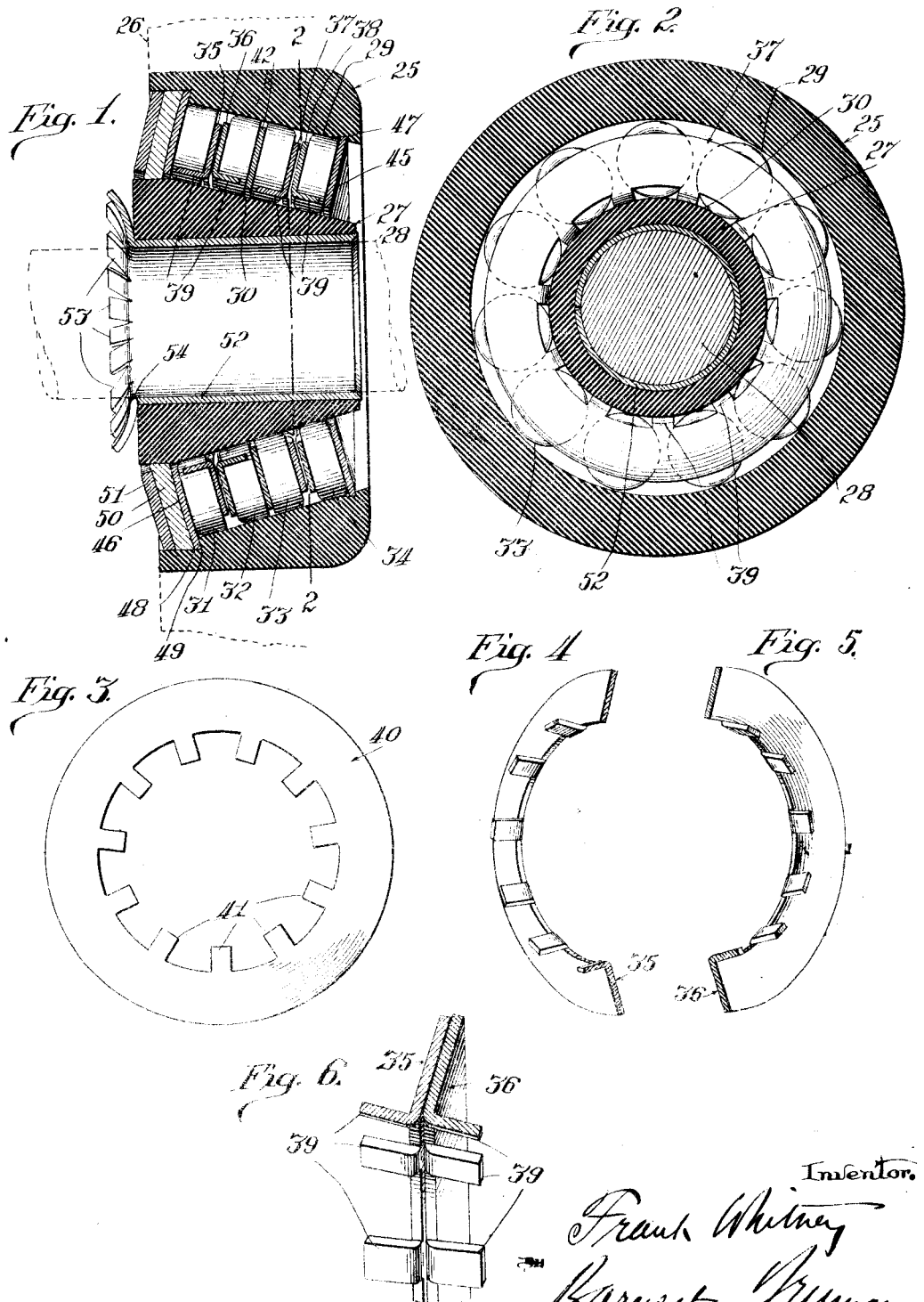

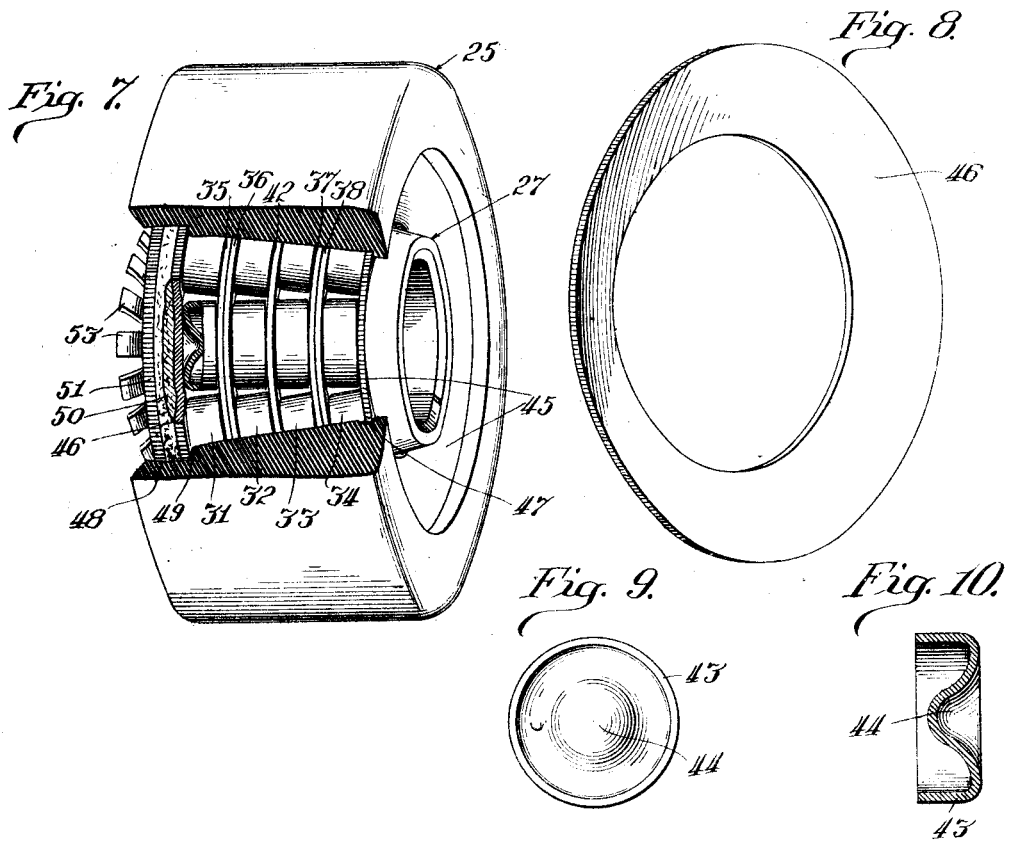

1,531,468

UNITED STATES PATENT OFFICE.

FRANK WHITNEY, OF HUBBARD WOODS, ILLINOIS.

ROLLER BEARING.

Application filed December 29, 1922. Serial No. 609,593.

*To all whom it may concern:*

Be it known that I, FRANK WHITNEY, a citizen of the United States, residing at Hubbard Woods, in the county of Cook and State of Illinois, have invented certain new and useful Improvements in Roller Bearings, of which the following is a specification.

My invention relates to roller bearings and more especially to bearings of the type comprising inner and outer bearing members, one rotatable with respect to the other, and formed with opposed conical faces between which are arranged in spaced circular series disc rollers, that is, rollers the width or thickness of which is less than their diameter and in which one bearing member is adjustable longitudinally to take up looseness in assembly or which may be developed through wear of the parts.

The object of the invention, generally speaking, is to provide certain improvements in roller bearings, and particularly in bearings of the type indicated, calculated to give the bearing increased durability, reduce the cost of manufacture, facilitate its installation and the replacement of worn parts and adapt the bearing to new and valuable uses in the mechanic arts. More specifically, the improvements contemplated comprise, among others of less importance to be hereinafter referred to: An arrangement back to back in pairs of the carrying rings or cages for the rollers with the interposition of lateral spacers between the several double series of rollers (where the bearing consists of more than two circular series of rollers), which arrangement decreases cost of manufacture of the carrying rings by making it possible to manufacture both rings of each pair from identical blanks and by the same tools, and, by use of lateral spacers of different thicknesses, facilitates adjustment of the rollers between the bearing elements and allows the pairs of roller series, that is to say, the rollers carried by each pair of carrying rings, to be laterally spaced apart to whatever extent may be deemed advisable; the engagement of the rollers with the outer bearing element instead of the inner bearing element, as is usual, which has the advantage that the inner bearing element, the part of the bearing that is subjected to greatest wear, may be removed and a new one put in its place without disturbing the rollers and their retaining devices, which remain in assembled relation in the outer member and that the inner cone is movable with respect to the discs when adjustment is made to take up wear, instead of the outer cone, so that since the circumference of the outer cone are greater there is less liability of wear or uneven wear or grooving of one of the cones than would otherwise be the case, and also the further advantage that when the bearing is used with a wheel, or like element, the bearing rollers and their retaining means remain in the wheel so that they are protected to a considerable extent from dirt and injury; the provision of the outer bearing element with retaining means for the rollers and their carrying and spacing rings which also serves to retain grease or oil in contact with the rollers; the retention of the rollers in the outer bearing element by rings which are, to all intents and purposes, unified with the cup so that the bearing cannot be tampered with by inexperienced persons and so that the outer bearing element and rollers form a unitary structure in assembling the bearing; the formation of one or both of these retaining rings with an inclination corresponding to the inclination of the rollers and with the surface in contact with the rollers spherical so that the edges of the rollers contact with the ring at all points; the provision of the outer bearing member with a washer or packing for preventing dust or dirt from entering the bearing, which device is so arranged that it does not have to be removed, in fact, is incapable of being removed, when the inner and outer bearing members are separated; a novel roller construction whereby the manufacture of the rollers from sheet metal is facilitated and cheapened and rollers are provided which will have very considerable strength with a certain elasticity to prevent their becoming broken in case of excessive crushing stresses, as well as providing cavities for the retention of grease; and a novel take-up device associated with the inner bearing element for bringing about the automatic following up of said inner bearing element as wear on the parts of the bearing takes place.

The invention is illustrated, in certain preferred embodiments, in the accompanying drawings wherein—

Fig. 1 is a longitudinal sectional view of a bearing constructed in accordance with my invention.

Fig. 2 is a cross sectional view on line 2—2 of Fig. 1.

Fig 3 is a detail view of one of the blanks from which the roller carrying rings are formed.

Figs 4 and 5 are fragmentary views, in perspective, of two roller carrying rings formed so as to fit one within the other, as contemplated by my invention.

Fig. 6 is a fragmentary sectional view showing the carrier rings fitted one into the other.

Fig. 7 is a view, in perspective, of the bearing with part of the outer bearing member broken away to show the rollers and their retaining devices.

Fig. 8 is a view, in perspective, of one of the rings employed for retaining the rollers and their carrying and spacing rings in place in the outer bearing member.

Fig. 9 is an end view of one of the rollers.

Fig. 10 is a cross sectional view of the roller.

Referring to the drawings, 25 designates the outer bearing member of the bearing which may be fitted into the housing of a wheel or other machine part indicated in fragmentary dotted outline at 26. 27 is the inner bearing member shown as arranged on a shaft 28. The bearing members 25, 27 are formed with opposed parallel, conical faces 29, 30 between which are a plurality of cylindrical rollers arranged in a plurality of spaced circular series. Four series of rollers are shown, the rollers of which are designated 31, 32, 33 and 34. The rollers are supported in carrying rings 35, 36, 37 and 38. These rings are arranged in pairs, back to back so to speak, and are formed with spacing lugs 39 which intervene between the several rollers so as to keep them from touching, the spacing lugs being formed at the inner edges of the rings and in the case of each pair of rings the lugs on one ring project in the opposite direction from the lugs on the other ring, all of the lugs being substantially parallel with and spaced a short distance from the surface 30 of the inner bearing member 27. The carrying rings of each pair are made from identical blanks. One of these blanks is illustrated in Fig. 3 and designated 40. In manufacturing the rings the blanks are first cut to the form shown in Fig. 3. The lugs 41 projecting inwardly from the inner edge of the ring are then bent out at right angles to the ring. Thereupon the rings are pressed to a conical configuration, some in one direction and others in the other direction, so that the rings can be fitted together in pairs as rights and lefts, so to speak. The advantage of this procedure is that the rings of each pair of rings can be cut out and formed by the same dies and tools. But the arrangement of the roller carrying rings in pairs back to back has another advantage. It is necessary to interpose between the two double series of rollers a spacing ring which will prevent the adjacent rollers from coming into contact with each other. Such spacing ring is shown at 42 in Figs. 1 and 7. A spacing ring may be used in this connection of whatever thickness may be required to occupy the space between the rollers when the latter are adjusted to their proper places on the outer bearing member. If desired, the spacing ring 42 may be made of very considerable thickness so as to give a "wide tread" bearing.

The rollers are preferably made of sheet metal formed by pressing to the configuration shown in Figs. 9 and 10. A disc is first cut out of sheet metal and is then pressed into concavo-convex form with its edges bent over to form a flange 43 projecting from the disc in the same direction as the concavity 44. The concavo-convex configuration of the web of the roller increases the strength of the roller and at the same time gives it a certain capacity for yielding under stresses which might otherwise be destructive. A crushing load on the roller deflects it equally across the tread instead of tending to break the web and bend the flange as with a roller of this type having a flat web. If a burr is formed in blanking the disc the roller will be pressed so that the burred edge will be on the inside of the roller, not along its bearing face. The rollers, it will be observed, have hollows or concavities on both sides which will serve to retain grease.

The rollers and their carrying and spacing rings are retained in the outer bearing member 25 by a pair of conical retaining rings 45, 46, ring 45 fitting into a recess 47 formed at the small end of the conical surface 29 and the ring 46 being driven into a recess 48 formed at the other end of the bearing member and against a shoulder 49. The intention is that the engagement between the ring 46 and the bearing member should be permanent, to all intents and purposes, so that after this ring has been driven into place the outer bearing member and the rollers and their carrying, spacing and retaining rings will constitute a single unitary structure. For this purpose either the surface of recess 48 or the outer edge of the ring 46 (Fig. 8) is knurled or milled or otherwise roughened; or both such surfaces may be so treated. It is particularly advantageous to knurl the surface 48 of the outer bearing member, as the member is of hardened steel and the knurling will cut the ring as it is driven into place. Once the ring is in place it will not rotate with the rollers and is removable from the bearing member only with considerable difficulty. The inner face of the retaining ring 46 instead of being flat is preferably concave so that the edges of the outer series of rollers 31 bear at all points on the ring. The spacing ring 42 may be similarly formed.

In order to prevent dust from entering the bearing a felt washer 50 is arranged outside of the retaining ring 46 in position to contact with the inner bearing member 27, this washer being held in place by a conical ring 51 having a drive fit in recess 48.

It will be observed that when the inner and outer bearing members are separated, that is, assuming that the outer bearing member is arranged in a wheel and the inner bearing member on a shaft, when the wheel is removed from the shaft all the parts of the bearing except the cone or inner bearing member 27 and spring member 52 remain in their assembled position in the wheel. For this reason the rollers and associated parts of the bearing are much less exposed to dirt or rough handling than they would be if they were removable either separate or as a unit. In fact, they are better protected in the wheel or other housing member than they would be if unified with the bearing member on the axle.

Other advantages are obtained by retaining the rollers in the outer bearing member. The wear on the inner bearing member is necessarily greater than the outer member because the paths of travel of the rollers on the inner member are shorter and the rollers are spaced more closely on the inner member and with smaller bearing surfaces, increasing, therefore, both friction and load on a given area. With the roller assembly unified with the outer bearing member the inner member may be replaced when worn, with minimum cost, and little or no trouble and without disturbing the rollers and their retaining and spacing devices.

Moreover, it is possible to associate the follow-up device for automatically taking up looseness due to wear with the inner bearing member which is a matter of some convenience. The cone alone is shifted instead of the cone and rollers, which involves bringing the rollers into contact with new surfaces on the cone, the part of the bearing which is subject to greatest wear. I have shown for this purpose a sleeve 52, preferably a longitudinally split sleeve which may be bent from a flat sheet of metal, this sleeve being inserted in the inner bearing member 27 between the same and shaft 28. The sleeve is formed at the large end of the bearing member with a plurality of spring fingers 53 which are first bent at substantially right angles over the edge of the bearing member, as indicated at 54, and are then curved outwardly as shown in Fig. 1.

When these fingers are flattened down by a nut on shaft 28 the bend takes place throughout the curved portions of the fingers and not at the angles or corners between the fingers and cylindrical portion of the sleeve so that the danger of the fingers being broken is minimized. The spring fingers when bent exert a constant pressure on the inner bearing member, tending to drive it into the inner member so that wear on the parts of the bearing does not involve any looseness. The other end of the sleeve is preferably upset a trifle to hold the sleeve in the cone. The rollers are, therefore, held in true bearing engagement with surfaces 29 and 30. The retaining rings 45 and 46, the spring ring 42 and the carrying rings 35, 36, 37 and 38 are all designed so as to most effectively space and guide the rollers to hold them in positions normal to the surfaces against which they bear.

There is still another advantage in having the roller assembly engaged with the outer bearing member in the manner shown and described. The retaining rings 45 and 46 form with the bearing member an annular channel for oil or grease, a considerable quantity of which may be kept in contact with the rollers at all times. The tight fit of the retaining rings prevents the lubricant from being thrown out of the bearing by centrifugal force.

It will be observed particularly from Fig. 2 that the bearing contemplates using what is approximately a full series of rollers. That is, the rollers are almost in contact one with another, being spaced apart just sufficiently so that they will not touch each other in operation under a load. By having the rollers unified with the outer bearing member instead of with the cone, and by using a substantially full series of rollers as shown, it is possible for certain types of machinery to omit the carrier rings or the lugs on them, and still have the rollers retained in their assembled relation when the inner bearing member or cone is removed.

It is fully realized that the principles of my invention might be utilized in connection with bearings constructed quite differently in points of detail, from the bearings illustrated and described herein. It is, therefore, my intent, in a portion of the novel and improved features constituting my invention broadly as well as narrowly within the scope of the appended claims.

I claim:

1. In a roller bearing, the combination of inner and outer bearing members having conical opposed faces, a plurality of series of disc rollers between said bearing members, conical retaining rings engaging said outer bearing member at opposite sides of said rollers so as to unify the rollers with said outer member, and means for giving longitudinal adjustment to the inner member relative to the rollers.

2. In a roller bearing, the combination of inner and outer bearing members having conical, opposed faces, cylindrical rollers between said bearing members, means for retaining said rollers in place comprising a ring which is substantially transverse to the conical faces of the bearing members and has a spherical curvature so that all points on the adjacent edges of the rollers bear against said ring.

3. In a roller bearing, the combination of inner and outer bearing members having conical, opposed faces, cylindrical rollers between said bearing members, and conical retaining rings on opposite sides of the rollers, the outer bearing member being recessed to receive said rings and the rings having a drive fit with the recessed portions of said bearing members.

4. In a roller bearing, the combination of inner and outer bearing members having conical, opposed faces, cylindrical rollers between said bearing members, and conical retaining rings on opposite sides of the rollers, the outer bearing member being recessed to receive said rings and one of the surfaces of contact, in each case, between ring and bearing member being milled and the ring having a drive fit with said bearing members.

5. In a roller bearing, the combination of inner and outer bearing members having conical, opposed faces, cylindrical rollers between said bearing members arranged in two circular series, and a pair of conical carrying rings, one of which fits within the other when assembled in the bearing, for supporting said series of rollers, respectively.

6. In a roller bearing, the combination of inner and outer bearing members having conical, opposed faces, cylindrical rollers between said bearing members arranged in two circular series, and a pair of conical carrying rings, one of which fits within the other when assembled in the bearing, and which are formed from identical blanks, for supporting said series of rollers, respectively.

7. In a roller bearing, the combination of inner and outer bearing members, rollers between said members arranged in a plurality of circular series carrying rings for the series of rollers severally which are formed with spacing lugs and are arranged back to back in pairs, and a ring arranged between the rollers of each pair of roller series.

8. In a roller bearing, the combination of inner and outer bearing members having opposed conical faces, cylindrical rollers between said members arranged in a plurality of circular series, conical carrying rings for the series of rollers severally which are arranged back to back and one within the other in pairs, and a ring between the pairs of roller series.

9. In a roller bearing, the combination of inner and outer bearing members, rollers between said members arranged in two circular series, and a pair of conical rings fitting one into the other and formed at their inner edges with oppositely projecting spacing lugs.

10. In a roller bearing, the combination of inner and outer bearing members having conical, opposed faces, cylindrical rollers between said bearing members arranged in two circular series, a pair of conical carrying rings, one of which fits within the other when assembled in the bearing, for supporting said series of rollers, respectively, and conical retaining rings for holding said rollers in place between said bearing members.

11. In a roller bearing, the combination of inner and outer bearing members having conical, opposed faces, cylindrical rollers between said bearing members arranged in two circular series, a pair of conical carrying rings, one of which fits within the other when assembled in the bearing, for supporting said series of rollers, respectively, and conical retaining rings unified with said outer bearing member for holding the rollers in place therein.

12. In a roller bearing, the combination of inner and outer bearing members, rollers between said members arranged in two circular series, a pair of conical rings fitting one into the other and formed at their inner edges with oppositely projecting spacing lugs, and conical rings for retaining said rollers and carrying rings in place between said bearing members.

13. In a roller bearing, the combination of inner and outer bearing members, rollers between said members arranged in two circular series, a pair of conical carrying rings fitting one into the other when assembled in the bearing and formed at their inner edges with oppositely projecting spacing lugs, and conical retaining rings unified with the outer bearing member for holding the rollers and carrying rings therein.

14. In a roller bearing, inner and outer bearing members having opposed, conical faces, a plurality of series of disc rollers between said members, retaining means for the rollers engaged so as to form a unitary structure with the outer bearing member, and a spring follow-up device adapted to be compressed so as to exert a pressure on the inner bearing member to automatically move the same to compensate for wear in the parts of the bearing.

15. In a roller bearing, inner and outer bearing members, having opposed, conical faces, a plurality of rollers between said members, retaining means for the rollers engaged so as to form a unitary structure with the outer bearing member, and a sleeve within the inner bearing member having spring fingers projecting therefrom which are adapted to exert a pressure on said bearing member to automatically move the same to compensate for wear.

16. In a roller bearing, inner and outer bearing members, having opposed, conical faces, a plurality of rollers between said members, retaining means for the rollers engaged so as to form a unitary structure with the outer bearing member, and a sleeve within the inner bearing member having spring fingers projecting from one end thereof which are bent at substantially right angles to the body of the sleeve and are then curved outwardly from the end of said inner bearing member, for the purpose described.

17. In a roller bearing, an outer bearing member having an interior conical face, a hollow cone, a plurality of rollers arranged between said member and cone, and a split sleeve in the cone formed with spring fingers which project from one end thereof and are adapted to be bent to exert a take-up pressure against said cone.

18. In a roller bearing, an outer bearing member having an interior conical face, a hollow cone, a plurality of rollers arranged between said member and cone, and a split sleeve in the cone formed with spring fingers which project from one end thereof and are adapted to be bent at right angles to the body of the sleeve and are then curved outwardly, for the purpose described.

19. A roller bearing roller consisting of a concavo-convex disc portion having a cylindrical flange projecting therefrom in the direction of the concavity of the disc.

20. A roller bearing roller formed of a single piece of sheet metal bent to form a flange, and a web which has a central concavity extending in the direction of the flanges.

21. A roller bearing comprising inner and outer bearing members having opposed conical faces, rollers between said bearing members, and a spring take up member unitary with one of said bearing members and comprising a plurality of spring fingers in radial arrangement with respect to the axis of the bearing.

22. In a combined thrust and radial load bearing, an inner conical bearing member provided with a laterally expanding take up member comprising a plurality of spring fingers in radial arrangement with respect to the axis of the cone.

23. In a roller bearing, the combination of inner and outer bearing members having opposed conical surfaces, a plurality of circular series of cylindrical rollers arranged between said members, and retaining means for said rollers comprising a pair of carrier rings for retaining adjacent series of rollers, and formed with spacing lugs which project toward each other, and a spacing ring between said two series of rollers.

24. In a roller bearing, the combination of opposed conical faced bearing members, a plurality of disc rollers arranged between same, and retaining rings for said rollers at opposite sides of the bearing, one presenting a concave annular surface.

25. In a roller bearing embodying, in combination, relatively adjustable conical faced bearing members, a plurality of series of disc rollers, means for spacing and guiding the rollers between said bearing members and unitary with the outer member, and annular retaining collars, one engaged with the outer member at the base of its cone to form with said member an oil pocket within the bearing.

26. In a roller bearing embodying, in combination, members having conical bearing surfaces of equal angle, a plurality of series of cylindrical faced disc roller elements, carriers therefor arranged between said members and unitary with the outer member, and an annular retaining collar engaged with the outer member at the end thereof having the larger internal diameter said inner member being adjustable in the direction of the axis of the bearing.

27. In a thrust and radial load roller bearing, the combination of two bearing members, two disc annular roller carrying rings nesting one within the other, each ring provided with spacing lugs for the rollers extending oppositely from the lugs of the other ring, each carrying the same number of disc rollers, and means for retaining and guiding said rollers and rings within the bearing members.

28. In a combined thrust and radial load roller bearing having conical bearing faces of equal angle, a plurality of cylindrical faced disc rollers arranged in angular series, an outer unitary bearing member, means embodied therein for retaining, spacing and guiding radially and laterally said rollers, a laterally adjustable unitary inner bearing member, and laterally expandable means embodied in said inner bearing member and coperating with said rollers within the outer unitary member.

29. In a roller bearing, the combination of two or more circular series of disc rollers, an outer conical bearing member, means embodied therein for retaining, spacing and separating said disc rollers, and an adjustable inner cone bearing member adapted to cooperate with said rollers, said inner bearing member provided with a laterally expanding member fixed thereto.

30. In a roller bearing embodying a lateral guiding member for the rollers having a radially curved concave surface on the side of the rollers, a cylindrical faced disc roller element provided with a raised outer circular rim on the side adapted to contact with the lateral guiding member.

31. In a roller bearing, the combination of two circular series of disc rollers, opposed bearing members having cones of equal angle, a pair of dished carrier rings of the same angle meshed one with the other when assembled in the bearing each with spacing lugs facing out from the body of the rings, retaining and separating said series of rollers, said rollers and carrier rings retained and guided laterally between two annular members.

32. In a roller bearing embodying laterally adjustable opposed conical faced bearing members, the combination of a sleeve provided at one end with a plurality of yieldable fingers adapted to be compressed laterally against one of said members.

33. In a roller bearing, an inner conical bearing member, an outer bearing member having a conical inner bearing surface adjustable lengthwise of the inner member, and carrying therein so as to form a unitary structure therewith, a plurality of circular series of disk rollers, and means for guiding, spacing and retaining the rollers in the outer bearing member.

34. In a roller bearing embodying conical bearing members and disc roller elements, an annular disk ring, one side of which forms a circular hollow grooved support for one side of the rollers.

35. In a roller bearing, an outer bearing member with interior conical face, disk roller elements, and spacing, guiding and retaining means for the rollers, all assembled to form a unit structure; in combination with an inner bearing member laterally adjustable with respect to said element.

36. In a roller bearing, the combination of an outer bearing member having a conical inner raceway, a plurality of disk roller elements arranged in a plurality of circular series in said members, means for guiding, spacing and retaining the rollers, an inner bearing member having an outer conical raceway, and means for retaining said inner member in continuous adjustment with said roller elements.

37. In a roller bearing embodying inner and outer bearing members, each provided with a conical bearing surface, a plurality of disk rollers arranged in a plurality of circular series within the outer member, said member embodying means for guiding, spacing and retaining said rollers, as a unit, and an inner member embodying laterally expanding means, unitary with said member for maintaining continuous adjustment between said rollers and bearing members.

FRANK WHITNEY.